(12) United States Patent
Sakurai

(10) Patent No.: US 12,511,940 B2
(45) Date of Patent: Dec. 30, 2025

(54) INFORMATION PROCESSING APPARATUS, INFORMATION PROCESSING METHOD, AND RECORDING MEDIUM

(71) Applicant: NEC Corporation, Tokyo (JP)

(72) Inventor: Kazuyuki Sakurai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/639,115

(22) PCT Filed: Mar. 30, 2021

(86) PCT No.: PCT/JP2021/013635
§ 371 (c)(1),
(2) Date: Feb. 28, 2022

(87) PCT Pub. No.: WO2022/208681
PCT Pub. Date: Oct. 6, 2022

(65) Prior Publication Data
US 2024/0037994 A1    Feb. 1, 2024

(51) Int. Cl.
*G06V 40/40* (2022.01)
*G06V 40/18* (2022.01)

(52) U.S. Cl.
CPC ............ *G06V 40/40* (2022.01); *G06V 40/193* (2022.01)

(58) Field of Classification Search
None
See application file for complete search history.

(56) References Cited

U.S. PATENT DOCUMENTS

| | | | |
|---|---|---|---|
| 10,817,722 B1* | 10/2020 | Raguin | G06V 40/40 |
| 2009/0003709 A1* | 1/2009 | Kaneda | G06V 10/454 |
| | | | 382/190 |
| 2018/0053044 A1 | 2/2018 | Su et al. | |
| 2018/0060648 A1 | 3/2018 | Yoo et al. | |
| 2019/0005318 A1 | 1/2019 | Su et al. | |
| 2019/0012533 A1 | 1/2019 | Su et al. | |
| 2019/0012534 A1 | 1/2019 | Su et al. | |
| 2019/0034708 A1 | 1/2019 | Yoo et al. | |
| 2019/0071095 A1* | 3/2019 | Hashimoto | G06F 3/013 |
| 2019/0320890 A1* | 10/2019 | Tahara | G06V 10/443 |

(Continued)

FOREIGN PATENT DOCUMENTS

| | | |
|---|---|---|
| CN | 109543635 A | 3/2019 |
| CN | 111353404 A | 6/2020 |

(Continued)

OTHER PUBLICATIONS

Saied, Marwa, Ayman Elshenawy, and Mohamed M. Ezz. "A Novel Approach for Improving Dynamic Biometric Authentication and Verification of Human Using Eye Blinking Movement." Wireless Personal Communications 115.1 (2020): 859-876. (Year: 2020).*

(Continued)

*Primary Examiner* — Michelle M Entezari Hausmann
(74) *Attorney, Agent, or Firm* — Sughrue Mion, PLLC

(57) ABSTRACT

An information processing apparatus (2) includes an acquisition unit (211) configured to acquire a person image (IMG) including an eye area (EA) of a target person, and a determination unit (212) configured to determine that the target person impersonates another person in the case where an aperture (AP) enclosing at least a part of an eye of the target person is present in the person image.

7 Claims, 5 Drawing Sheets

(56) References Cited

U.S. PATENT DOCUMENTS

| | | | |
|---|---|---|---|
| 2020/0143156 A1 | 5/2020 | Su et al. | |
| 2020/0349372 A1 | 11/2020 | Lee et al. | |
| 2020/0410215 A1 | 12/2020 | Yoo et al. | |
| 2021/0209387 A1 | 7/2021 | Nikitidis et al. | |
| 2021/0248401 A1* | 8/2021 | Timoshenko | G06V 40/40 |
| 2021/0334526 A1 | 10/2021 | Su et al. | |
| 2022/0245968 A1* | 8/2022 | Lee | G06V 40/167 |
| 2022/0277596 A1* | 9/2022 | Li | G06T 7/74 |
| 2023/0091381 A1* | 3/2023 | Vemulapalli | G06V 10/56 |
| | | | 382/117 |

FOREIGN PATENT DOCUMENTS

| | | |
|---|---|---|
| JP | 06-309457 A | 11/1994 |
| JP | 2004-178402 A | 6/2004 |
| JP | 2006-330936 A | 12/2006 |
| JP | 2010-097619 A | 4/2010 |
| JP | 2010-286959 A | 12/2010 |
| JP | 2015-041307 A | 3/2015 |
| JP | 2018-032391 A | 3/2018 |
| JP | 2018-169943 A | 11/2018 |
| JP | 2019-139433 A | 8/2019 |
| JP | 2020-181305 A | 11/2020 |
| JP | 2020-184331 A | 11/2020 |
| WO | 2016/147272 A1 | 9/2016 |

OTHER PUBLICATIONS

Manjani, Ishan, et al. "Detecting silicone mask-based presentation attack via deep dictionary learning." IEEE Transactions on Information Forensics and Security 12.7 (2017): 1713-1723. (Year: 2017).*

Wang L, Ding X, Fang C, Liu C, Wang K. Eye blink detection based on eye contour extraction. InImage Processing: Algorithms and Systems VII Feb. 10, 2009 (vol. 7245, pp. 222-228). SPIE. (Year: 2009).*

He, Chaoxiang, et al. "Mysticmask: Adversarial mask for impersonation attack against face recognition systems." 2024 IEEE International Conference on Multimedia and Expo (ICME). IEEE, 2024. (Year: 2024).*

Taha, Noor Al-Huda, Taha Mohammed Hassan, and Mohammed Akram Younis. "Face spoofing detection using deep CNN." Turkish J. Comput. Math. Educ.(TURCOMAT) 12.13 (2021): 4363-4373. (Year: 2021).*

Kim, Ki Wan, Hyung Gil Hong, Gi Pyo Nam, and Kang Ryoung Park. "A study of deep CNN-based classification of open and closed eyes using a visible light camera sensor." Sensors 17, No. 7 (2017): 1534. (Year: 2017).*

Al-Waisy, Alaa S., et al. "A fast and accurate iris localization technique for healthcare security system." 2015 IEEE International Conference on Computer and Information Technology; Ubiquitous Computing and Communications; Dependable, Autonomic and Secure Computing; Pervasive Intelligence and Computi (Year: 2015).*

Wang, Liting, et al. "Eye blink detection based on eye contour extraction." Image Processing: Algorithms and Systems VII. vol. 7245. SPIE, 2009. (Year: 2009).*

Al-Rashid, Ali. "A Three Steps Eye-Liveness Validation System." 2019 International Conference on Cyber Security for Emerging Technologies (CSET). IEEE, 2019. (Year: 2019).*

Luo, Shiqing, et al. "Oculock: Exploring human visual system for authentication in virtual reality head-mounted display." 2020 Network and Distributed System Security Symposium (NDSS). 2020. (Year: 2020).*

Extended European Search Report for EP Application No. 21934851. 3, dated on Mar. 5, 2024.

JP Office Action for JP Application No. 2024-063815, mailed on Jan. 28, 2025 with English Translation.

Takuya Kira et al., "Bio-distrinction of e-Learning student using blink detection", the 72nd (Heisei 22(2010)) national conference lecture collected papers (2) Artificial intelligence, cognitive science, Japan, Information Processing Society of Japan, Mar. 8, 2010, pp. 2-685 to 2-686.

JP Official Communication for JP Application No. 2024-063815, mailed on Apr. 8, 2025 with English Translation.

* cited by examiner

INFORMATION PROCESSING APPARATUS, INFORMATION PROCESSING METHOD, AND RECORDING MEDIUM

CROSS REFERENCE TO RELATED APPLICATIONS

This application is a National Stage of International Application No. PCT/JP2021/013635 filed Mar. 30, 2021.

TECHNICAL FIELD

This disclosure relates to a technical field of an information processing apparatus, an information processing method and a recording medium that are, for example, capable of determining whether or not a target person shown in a person image impersonates another person.

BACKGROUND TECHNIQUE

One example of an information processing apparatus capable of determining whether or not a target person shown in a person image impersonates another person is disclosed in Patent Reference 1. In Patent Reference 1, an information processing apparatus capable of determining whether a face shown in an image captured using a camera is a real face of a person, or a fake face is disclosed.

In addition, Patent Reference 2 to Patent Reference 5 are listed as prior art references related to this disclosure.

CITATION LIST

Patent References

Patent Reference 1

Japanese Patent Laid-Open No. 2020-184331

Patent Reference 2

Japanese Patent Laid-Open No. H06-309457

Patent Reference 3

Japanese Patent Laid-Open No. 2004-178402

Patent Reference 4

Japanese Patent Laid-Open No. 2006-330936

Patent Reference 5

Japanese Patent Laid-Open No. 2010-286959

SUMMARY

Technical Problem

It is an example object of the present disclosure to provide an information processing apparatus, an information processing method and a recording medium that aims to an improvement of a technique disclosed in the background art document.

Solution to Problem

One example aspect of an information processing apparatus includes: an acquisition unit configured to acquire a person image including an eye area of a target person; and a determination unit configured to determine that the target person impersonates another person in the case where an aperture enclosing at least a part of an eye of the target person included in the eye area is present in the person image.

One example aspect of an information processing method includes: acquiring a person image including an eye area of a target person; and, determining that the target person impersonates another person in the case where an aperture enclosing at least a part of an eye of the target person included in the eye area is present in the person image.

One example aspect of a recording medium is a recording medium storing a computer program for causing a computer to execute an information processing method including: acquiring a person image showing a target person, and, determining that the target person impersonates another person in the case where an aperture enclosing at least a part of an eye of the target person included in the eye area is present in the person image.

DESCRIPTION OF EXAMPLE EMBODIMENTS

Hereinafter, example embodiments of an information processing apparatus, an information processing method, and a recording medium will be described. Hereinafter, using an information processing system SYS to which an example embodiment of the information processing apparatus, the information processing method, and the recording medium is applied, the example embodiment of the information processing apparatus, the information processing method, and the recording medium will be described.

(1) Configuration of Information Processing System SYS

First, the configuration of the information processing system SYS of the present example embodiment will be described.

(1-1) Overall Configuration of Information Processing System SYS

Figure 1:
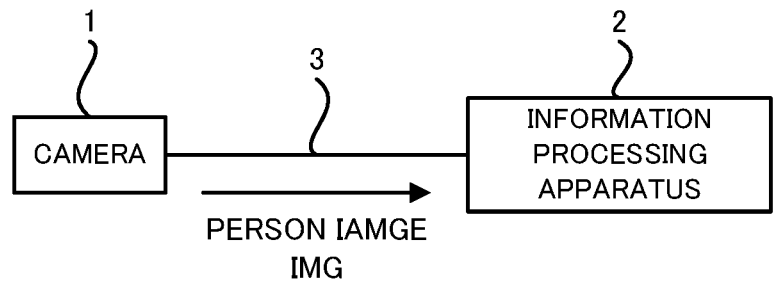
FIG. 1 is a block diagram showing the overall configuration of an information processing system of the present example embodiment.

First, with reference to FIG. 1, the overall configuration of the information processing system SYS of the present example embodiment will be described. FIG. 1 is a block diagram showing the overall configuration of the information processing system SYS of the present example embodiment.

As shown in FIG. 1, the information processing system SYS includes a camera 1 and an information processing apparatus 2. The information processing system SYS may include a single camera 1, or a plurality of cameras 1. The camera 1 and the information processing apparatus 2 are capable of communicating with each other through a communication network 3. The communication network 3 may include a wired communication network. The communication network 3 may include a wireless communication network.

Figure 5:
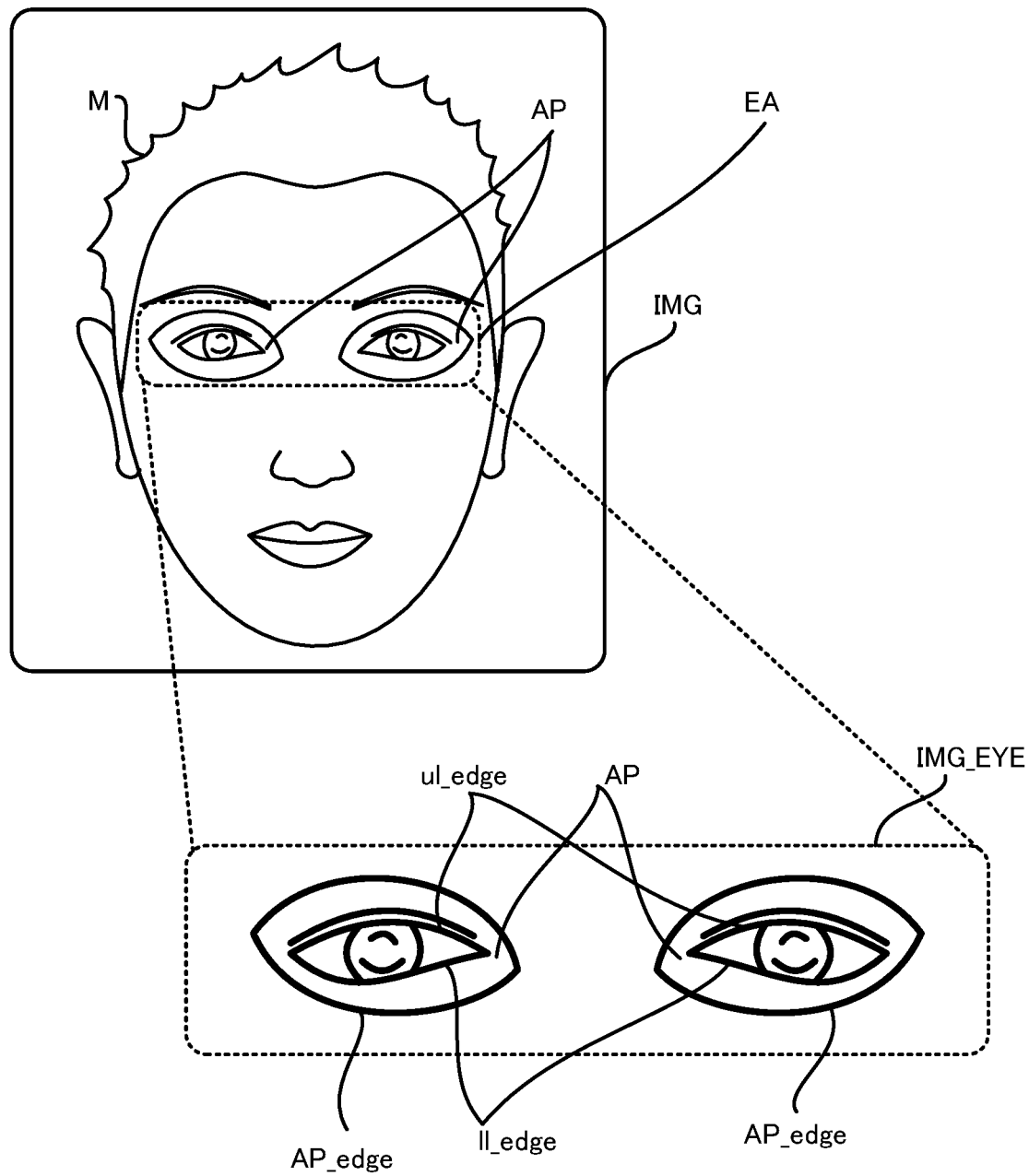
FIG. 5 is a plan view showing one example of a person image showing a target person wearing a mask having apertures, together with an enlarged view of a partial image portion including the eyes of the target person in the person image.
Figure 6:
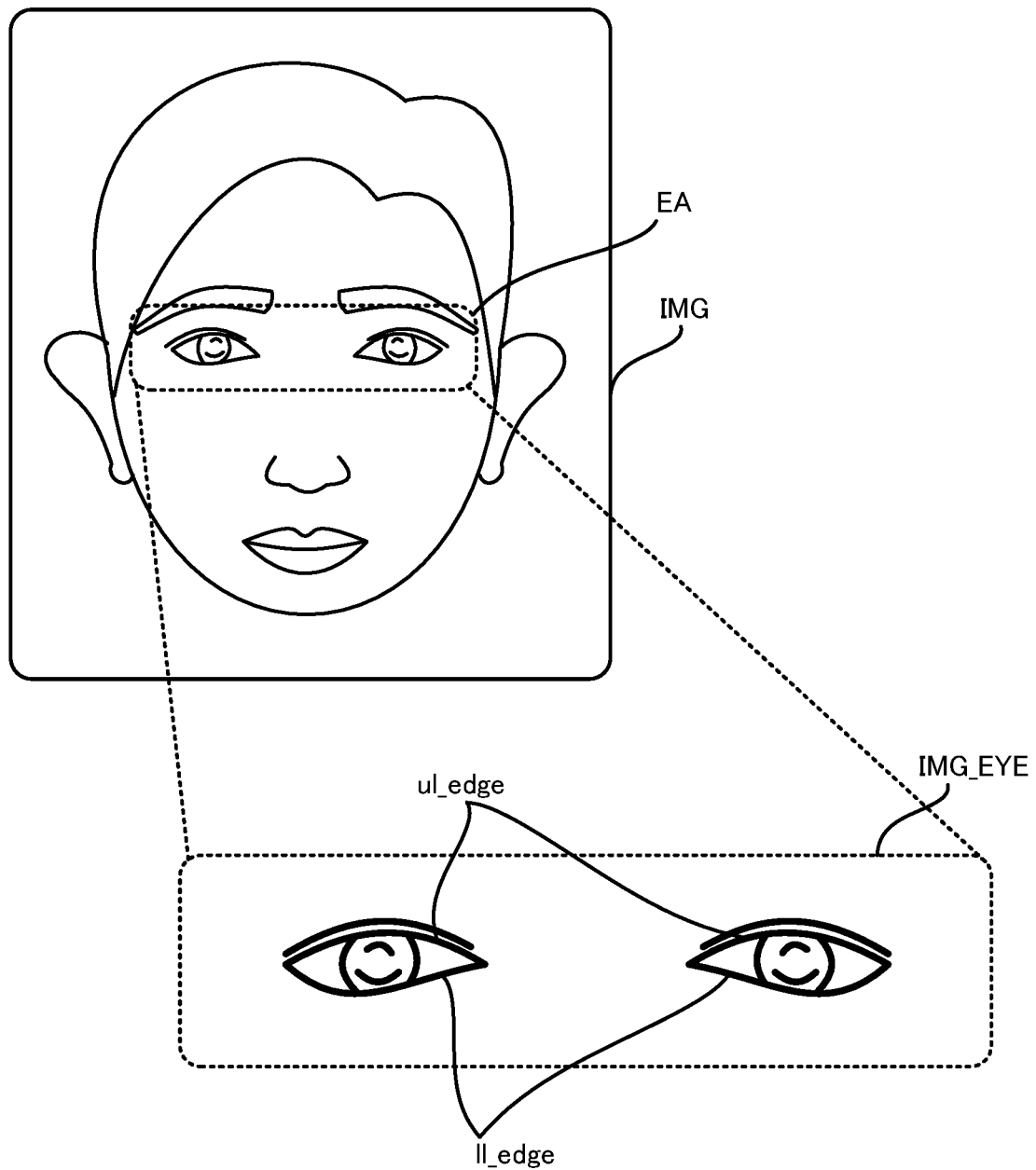
FIG. 6 is a plan view showing one example of a person image showing a target person who is not wearing a mask having apertures, together with an enlarged view of a partial image portion including the eyes of the target person in the person image.

The camera 1 is an imaging apparatus capable of capturing an image of a target person (i.e., a person) positioned within an imaging range of the camera 1. The camera 1 captures an image of a target person, and thereby generates a person image IMG showing the target person captured by the camera 1. In particular, the camera 1 captures an image of a face of the target person (particularly, a part of the face, including at least eyes), and thereby generates the person image IMG showing the face (particularly a part of the face, including at least eyes) of the person. In short, the camera 1 generates the person image IMG including an eye area (EA) of the target person. The eye area EA of the target person may, for example, mean an area of a predetermined shape (for example, a rectangular shape) including the eyes of the target person. The eye area EA of the target person may, for example, mean an area of a predetermined shape located within a range of a predetermined distance from the eyes of the target person. As one example, as shown in FIG. 5 and FIG. 6 later, the eye area EA of the target person may mean an area included in an eye image IMG-EYE. Note that the person image IMG may include, or may not include, an area other than the eye area of the target person as long as the person image IMG includes the eye area of the target person. Therefore, the "person image IMG showing the target person" in the present example embodiment may mean the person image IMG showing at least the eye area of the target person, may mean the person image IMG showing at least a part of the target person including the eye area (for example, the face), or may mean the person image IMG showing the whole body of the target person. In either case, an image including at least the eye area of the target person may be used as the person image IMG. The camera 1 outputs the generated person image IMG to the information processing apparatus 2. Specifically, the camera 1 transmits the generated person image IMG to the information processing apparatus 2 through the communication network 3.

The information processing apparatus 2 is capable of performing an impersonation determination operation. Specifically, the information processing apparatus 2 is capable of receiving the person image IMG transmitted from the camera 1 through the communication network 3. Furthermore, the information processing apparatus 2 is capable of determining, based on the received person image IMG, whether or not the target person shown in the person image IMG (i.e., the target person in front of the camera 1) is likely impersonating another person different from the target person.

Figure 2:
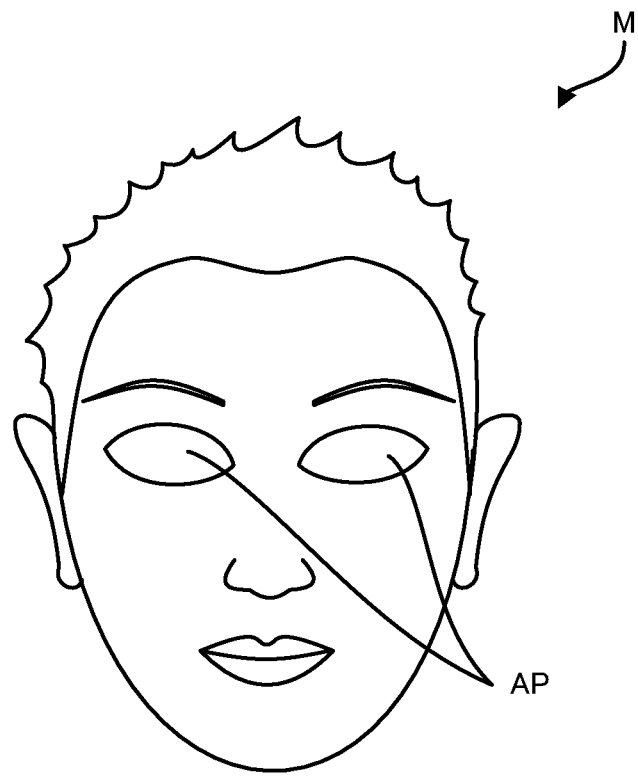
FIG. 2 shows one example of a mask that is worn by a target person for impersonating another person.

In the present example embodiment, the information processing apparatus 2 is capable of determining whether or not the target person impersonates another person by wearing (for example, putting on) a mask M imitating another person. One example of the mask M that is a target for the impersonation determination operation is shown in FIG. 2. As shown in FIG. 2, in the present example embodiment, the information processing apparatus 2 is capable of determining whether or not the target person impersonates another person by wearing the mask M having an aperture AP at a part corresponding to an eye of another person. Note that FIG. 2 shows an example in which the aperture AP is an aperture having a horizontally elongated circular shape. However, the shape of the aperture AP is not limited to the shape shown in FIG. 2. For example, the shape of the aperture AP may be any circular shape, any elliptical shape, any polygonal shape, or a shape corresponding to any closed curved line.

Note that the "mask" in the present example embodiment may mean an object (member) accessory that is wearable by the target person, and is capable of covering (in other words, hiding) at least a part of the face of the target person when it is worn by the target person. For example, a mask that completely covers the head of the target person may be used as the mask M. For example, a mask (so-called a face mask) that covers a part of the head of the target person (for example, the front of the face of the target person) may be used as the mask M.

Here, as one example of a method for determining whether or not the target person in front of the camera 1 impersonates another person, there is a method of determining whether or not the target person impersonates another person by determining whether or not an imaged person shown in the person image IMG blinks according to a predetermined instruction. An information processing apparatus of a comparative example using this method can appropriately determine whether or not the target person impersonates another person mainly when the target person causes the camera 1 to capture an image of a photograph of another person, or a display showing another person, for impersonating another person. This is because it is hard for the another person shown in the photograph, or displayed on the display, to blink according to the predetermined instruction. Therefore, typically, when the imaged person shown in the person image IMG does not blink according to the predetermined instruction, the information processing apparatus of the comparative example determines that the imaged person shown in the person image IMG is a person different from the target person in front of the camera 1 (consequently, the target person impersonates another person). However, in a case where the target person wears the mask M having the aperture AP at a part corresponding to an eye of another person, the eye of the target person wearing the mask M is exposed through the aperture AP. Hence, when the target person wearing the mask M blinks, the information processing apparatus of the comparative example determines that the target person shown in the person image IMG blinks according to the predetermined instruction. As a result, the information processing apparatus of the comparative example has a technical problem, that is, makes an erroneous determination that the target person does not impersonate another person despite the fact that the target person impersonates another person.

Hence, in the present example embodiment, the information processing apparatus 2 capable of solving the above-mentioned technical problem will be described. That is to say, the present example embodiment will describe the information processing apparatus 2 capable of appropriately determining whether or not the target person impersonates another person under a situation in which the target person impersonates another person by wearing the mask M having the aperture AP at a part corresponding to the eye of another person.

(1-2) Configuration of Information Processing Apparatus 2

Figure 3:
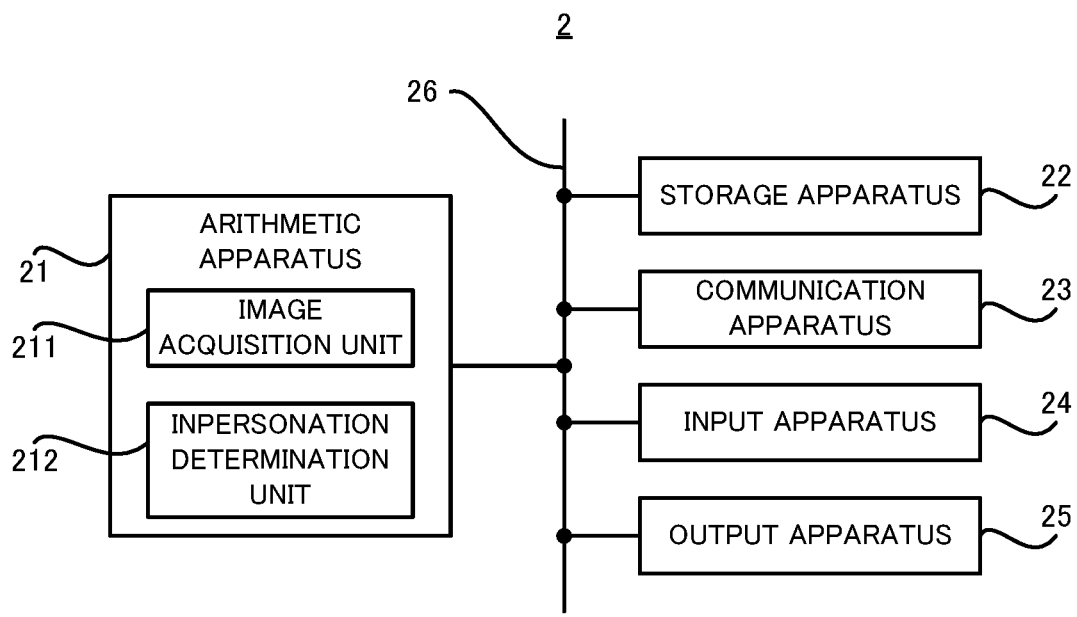
FIG. 3 is a block diagram showing the configuration of an information processing apparatus of the present example embodiment.

Subsequently, with reference to FIG. 3, the configuration of the information processing apparatus 2 of the present example embodiment will be described. FIG. 3 is a block diagram showing the configuration of the information processing apparatus 2 of the present example embodiment.

As shown in FIG. 3, the information processing apparatus 2 includes an arithmetic apparatus 21, a storage apparatus 22, and a communication apparatus 23. The information processing apparatus 2 may further include an input apparatus 24, and an output apparatus 25. Note that the information processing apparatus 2 may not include at least one of the input apparatus 24 and the output apparatus 25. The information processing apparatus 2 may be connected to the arithmetic apparatus 21, the storage apparatus 22, the communication apparatus 23, the input apparatus 24, and the output apparatus 25 through a data bus 26.

The arithmetic apparatus 21 includes, for example, at least one of a central processing unit (CPU), a graphics processing unit (GPU), and a field programmable gate array (FPGA). The arithmetic apparatus 21 reads a computer program. For example, the arithmetic apparatus 21 may read a computer program stored in the storage apparatus 22. For example, the arithmetic apparatus 21 may read a computer program stored in a computer-readable non-transitory recording medium using a recording medium reading apparatus, not shown, provided in the information processing apparatus 2. The arithmetic apparatus 21 may acquire (i.e., download or read) a computer program from an apparatus, not shown, disposed outside the information processing apparatus 2, through the communication apparatus 23 (or another communication apparatus). The arithmetic apparatus 21 executes the read computer program. As a result, a logic function block for executing an operation to be performed by the information processing apparatus 2 (for example, the above-described impersonation determination operation) is realized in the arithmetic apparatus 21. That is to say, the arithmetic apparatus 21 is capable of functioning as a controller for realizing the logic function block for executing the operation (in other words, processing) to be performed by the information processing apparatus 2.

FIG. 3 shows one example of the logic function block that is realized in the arithmetic apparatus 21 to execute the impersonation determination operation. As shown in FIG. 3, in the arithmetic apparatus 21, an image acquisition unit 211 as a specific example of an "acquisition unit", and an impersonation determination unit 212 as a specific example of a "determination unit" are realized. The image acquisition unit 211 is capable of acquiring the person image IMG from the camera 1. The impersonation determination unit 212 is capable of determining, based on the person image IMG acquired by the image acquisition unit 211, whether or not a target person shown in the person image IMG (i.e., the target person in front of the camera 1) impersonates another person different from the target person.

The storage apparatus 22 is capable of storing desired data. For example, the storage apparatus 22 may temporarily store a computer program to be executed by the arithmetic apparatus 21. The storage apparatus 22 may temporarily store data that is temporarily used by the arithmetic apparatus 21 when the arithmetic apparatus 21 is executing the computer program. The storage apparatus 22 may store data that is stored for a long time in the information processing apparatus 2. Note that the storage apparatus 22 may include at least one of a random access memory (RAM), a read only memory (ROM), a hard disk device, a magneto-optical disk device, a solid state drive (SSD), and a disk array device. In short, the storage apparatus 22 may include a non-transitory recording medium.

The communication apparatus 23 is capable of communicating with the camera 1 through the communication network 3. In the present example embodiment, the communication apparatus 23 receives (i.e., acquires) the person image IMG from the camera 1 through the communication network 3.

The input apparatus 24 is an apparatus that receives an input of information to the information processing apparatus 2 from outside the information processing apparatus 2. For example, the input apparatus 24 may include a manipulation apparatus (for example, at least one of a keyboard, a mouse and a touch panel) that can be manipulated by an operator of the information processing apparatus 2. For example, the input apparatus 24 may include a reading apparatus capable of reading information recorded as data on a recording medium that can be externally attached to the information processing apparatus 2.

The output apparatus 25 is an apparatus that outputs information to the outside of the information processing apparatus 2. For example, the output apparatus 25 may output the information as an image. For example, the output apparatus 25 may include a display apparatus (so-called display) capable of displaying an image showing information desired to be outputted. For example, the output apparatus 25 may output the information as sound. In other words, the output apparatus 25 may include an audio apparatus (so-called speaker) capable of outputting sound. For example, the output apparatus 25 may output the information onto paper. That is to say, the output apparatus 25 may include a printing apparatus (so-called printer) capable of printing desired information onto paper.

(2) Impersonation Determination Operation to be Performed by Information Processing Apparatus 2

Figure 4:
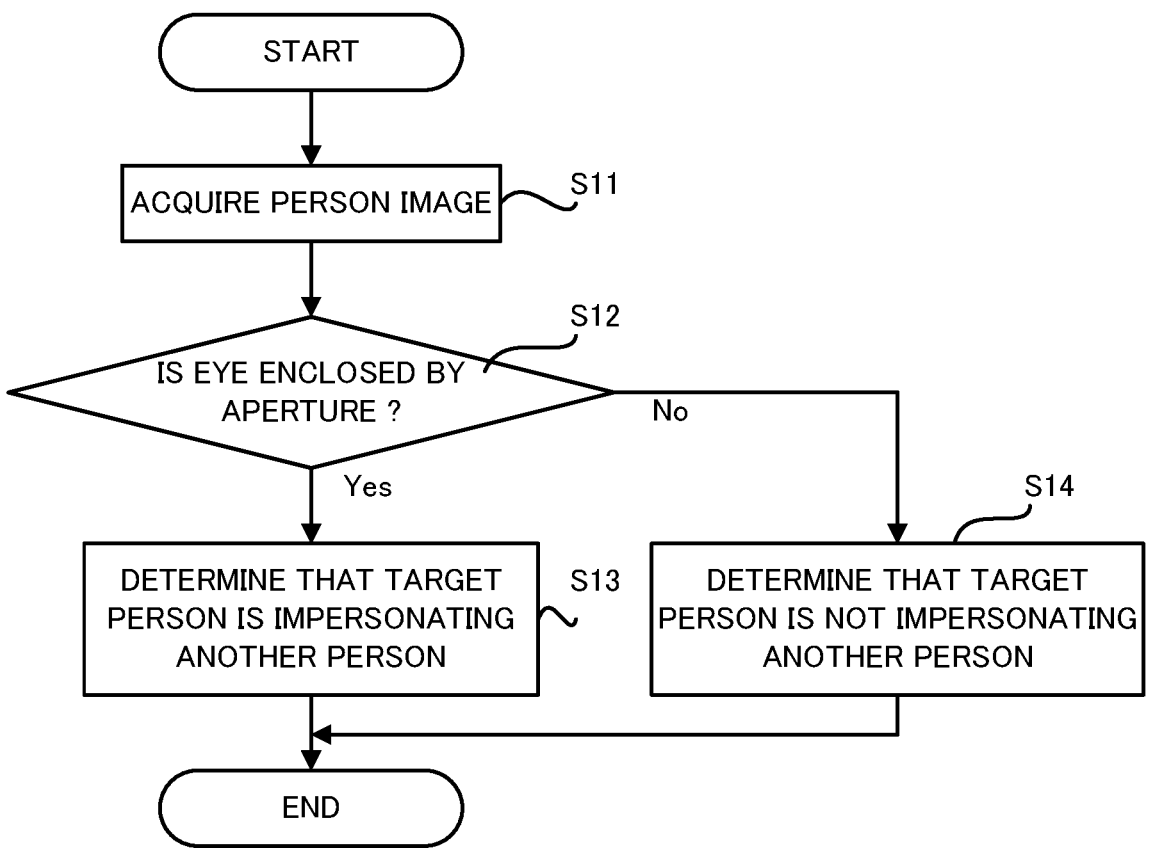
FIG. 4 is a flowchart showing a flow of an impersonation determination operation that is performed by the information processing apparatus of the present example embodiment.

Subsequently, with reference to FIG. 4, the impersonation determination operation to be performed by the information processing apparatus 2 will be described. FIG. 4 is a flowchart showing a flow of the impersonation determination operation to be performed by the information processing apparatus 2.

As shown in FIG. 4, the image acquisition unit 211 acquires the person image IMG from the camera 1, using the communication apparatus 23 (a step S11).

Thereafter, the impersonation determination unit 212 determines, based on the person image IMG acquired in the step S11, whether or not the target person shown in the person image IMG (i.e., the target person in front of the camera 1) impersonates another person different from the target person (a step S12 to a step S14).

Here, FIG. 5 shows one example of the person image IMG showing the target person wearing the mask M having the apertures AP, together with an enlarged view of a partial image portion including an eye area EA of the target person in the corresponding person image IMG (hereinafter referred to as the "eye image IMG_EYE). In a case where the target person is wearing the mask M having the apertures AP as shown in FIG. 5, the mask M imitating another person different from the target person, and the eyes of the target person which are at least partly exposed through the apertures AP are shown in the person image IMG. That is to say, in the person image IMG, at least a part of the eye of the target person is exposed through the aperture AP.

In other words, in the case where the target person is wearing the mask M having the apertures AP, the eyes of the target person which are at least partly enclosed by the apertures AP are shown in the person image IMG. That is to say, in the person image IMG, at least a part of the eye of the target person is enclosed by the aperture AP. Note that the state mentioned here in which "at least a part of the eye of the target person is enclosed by the aperture AP" may mean, for example, a state in which "at least a part of the eye of the target person is enclosed by an outer edge AP_edge of the aperture AP (i.e., the outer edge forming the aperture AP of the mask M).

Note that FIG. 5 shows an example in which the whole eye of the target person is exposed through the aperture AP (i.e., the whole eye of the target person is enclosed by the aperture AP). The state in which "the whole eye of the target person is exposed through the aperture AP" may mean, for example, a state in which each of "a lower edge ul_edge of an upper eyelid and an upper edge ul_edge of a lower eyelid of the target person is entirely exposed through the aperture AP. The state in which "the whole eye of the target person is enclosed by the aperture AP" may mean, for example, a state in which each of "the lower edge ul_edge of the upper eyelid and the upper edge ul_edge of the lower eyelid of the target person is entirely enclosed by the aperture AP".

Note that a part of the eye of the target person may not be exposed through the aperture AP. That is to say, a part of the eye of the target person may not be enclosed by the aperture AP. For example, in a case where the size of the eye in the horizontal direction of the target person (for example, the length from an outer corner of the eye to an inner corner of the eye) is larger than the size of the aperture AP in the horizontal direction, a part of the eye of the target person is not exposed through the aperture AP, and is covered with the mask M. Similarly, in a case where the size of the eye in the vertical direction of the target person (for example, the distance between the lower edge ul_edge of the upper eyelid and the upper edge ul_edge of the lower eyelid) is larger than the size of the aperture AP in the vertical direction, a part of the eye of the target person is not exposed through the aperture AP, and is covered with the mask M. Therefore, in these cases, while a part of the eye of the target person is exposed through the aperture AP, another part of the eye of the target person may not be exposed through the aperture AP. That is to say, while a part of the eye of the target person is exposed through the aperture AP, another part of the eye of the target person may be covered with the mask M. In other words, while a part of the eye of the target person is enclosed by the aperture AP, another part of the eye of the target person may not be enclosed by the aperture AP. In any case, it remains the same that, when the target person is wearing the mask M having the apertures AP, at least a part (i.e., the whole or a part) of the eye of the target person is exposed through the aperture AP (i.e., enclosed by the aperture AP).

Considering such a state in which the eye of the target person are enclosed by the aperture AP, the "eye" in the present example embodiment means a part of the target person that includes not only an eyeball, but also appendages attached to the eyeball (particularly, appendages visible from outside, as one example, the eyelids including the upper and lower eyelids described above). Therefore, the state in which "at least a part of the eye of the target person is enclosed by the aperture AP" in the present example embodiment may include a state in which at least a part of the eyeball of the target person is enclosed by the aperture AP, and a state in which at least a part of appendages attached to the eyeball of the target person is enclosed by the aperture AP. Note that the "eye" in the present example embodiment may mean a part of the target person which includes the eyeball, but does not include appendages attached to the eyeball.

On the other hand, FIG. 6 shows one example of the person image IMG showing the target person who is not wearing the mask M having the apertures AP, together with an enlarged view of the "eye image IMG_EYE including the eye area EA of the target person in the person image IMG. As shown in FIG. 6, when the target person is not wearing the mask M having the apertures AP, there will be no case where at least a part of the eye of the target person is shown in the person image IMG so that it is exposed through the aperture AP. That is to say, there will be no case where at least a part of the eye of the target person is enclosed by the aperture AP (for example, there will be no case where it is enclosed by the outer edge AP_edge of the aperture AP) in the person image IMG.

In the present example embodiment, the impersonation determination unit 212 determines, based on the difference between the person image IMG showing the target person wearing the mask M and the person image IMG showing the target person who is not wearing the mask M, whether or not the target person impersonates another person. Specifically, the impersonation determination unit 212 determines whether or not at least a part of the eye of the target person is enclosed by the aperture AP (for example, enclosed by the outer edge AP_edge of the aperture AP) in the person image IMG acquired in the step S11, (the step S12). That is to say, the impersonation determination unit 212 determines whether or not the aperture AP enclosing at least a part of the eye of the target person is present (for example, whether or not the outer edge AP_edge of the aperture AP enclosing at least a part of the eye of the target person is present) in the person image IMG acquired in the step S11, (the step S12). In other words, the impersonation determination unit 212 determines whether or not an object (the mask M in the present example embodiment) having the aperture AP enclosing at least a part of the eye of the target person is present in the person image IMG acquired in the step S11, (the step S12).

Note that, as described above, when at least a part of the eye of the target person is enclosed by the aperture AP, at least a part of the eye of the target person is exposed through the aperture AP. Therefore, the operation for determining whether or not at least a part of the eye of the target person is enclosed by the aperture AP in the step S12 may be practically regarded as equivalent to the operation for determining whether or not at least a part of the eye of the target person is exposed through the aperture AP. The operation for determining whether or not at least a part of the eye of the target person is enclosed by the aperture AP in the step S12 may be practically regarded as equivalent to the operation for determining whether or not the aperture AP through which at least a part of the eye of the target person is exposed is present. The operation for determining whether or not at least a part of the eye of the target person is enclosed by the aperture AP in the step S12 may be practically regarded as equivalent to the operation for determining whether or not the object (the mask M in the present example embodiment) having the aperture AP through which at least a part of the eye of the target person is exposed is present.

The impersonation determination unit 212 may perform image analysis processing for analyzing at least a part of the person image IMG (for example, the eye image IMG_EYE described above) so as to determine whether or not at least a part of the eye of the target person is enclosed by the aperture AP. For example, the impersonation determination unit 212 may detect the eyes of the target person from the person image IMG, and determine whether or not the apertures AP enclosing the eyes of the target person are present around the eyes of the target person. In this case, the impersonation determination unit 212 may determine whether or not the apertures AP are present in the person image IMG by performing template matching using a template corresponding to the apertures AP.

The impersonation determination unit 212 may perform edge extraction processing on at least a part of the person image IMG, and determine whether or not there is an edge enclosing each eye of the target person (i.e., an outline of an arbitrary object enclosing each eye of the target person, here an outline of the mask M forming the outer edge AP_edge of the aperture AP) so as to determine whether or not at least a part of the eye of the target person is enclosed by the aperture AP. Specifically, the impersonation determination unit 212 may generate an edge image representing an edge within at least a part of the person image IMG by performing the edge extraction processing on at least a part of the person image IMG (for example, the eye image IMG_EYE described above). For example, the impersonation determination unit 212 may generate the edge image by performing filtering processing using a first order differential filter on the person image IMG. The impersonation determination unit 212 may perform the filtering processing using at least one of a first order differential filter in a vertical direction and a first order differential filter in a horizontal direction. An edge corresponding to the eye of the target person usually appears in the edge image. The edge corresponding to the eye of the target person may include at least one of an edge corresponding to the lower edge ul_edge of the upper eyelid and the upper edge ul_edge of the lower eyelid. Furthermore, in the case where the target person is wearing the mask M, an edge corresponding to the aperture AP appears in the edge image. The edge corresponding to the aperture AP may include an edge corresponding to the outer edge AP_edge of the aperture AP (i.e., a partial edge forming the outer edge AP_edge of the aperture AP in the mask M, typically an edge forming a closed loop). Therefore, the impersonation determination unit 212 may determine whether or not the edge corresponding to the aperture AP enclosing the edge corresponding to the eye of the target person is present within the edge image. When the edge corresponding to the aperture AP enclosing the edge corresponding to the eye of the target person is present, the impersonation determination unit 212 may determine that at least a part of the eye of the target person is enclosed by the aperture AP.

The impersonation determination unit 212 may determine, using a learnable arithmetic model, whether or not at least a part of the eye of the target person is enclosed by the aperture AP. For example, the impersonation determination unit 212 may determine whether or not at least a part of the eye of the target person is enclosed by the aperture AP, using an arithmetic model that, upon input of at least a part of the person image IMG, outputs a result of the determination as to whether or not at least a part of the eye of the target person is enclosed by the aperture AP. For example, the impersonation determination unit 212 may determine whether or not at least a part of the eye of the target person is enclosed by the aperture AP, using an arithmetic model that, upon input of the edge image generated by performing the edge extraction processing on at least a part of the person image IMG, outputs a result of the determination as to whether or not at least a part of the eye of the target person is enclosed by the aperture AP.

One example of the learnable arithmetic model is an arithmetic model using a neural network. The impersonation determination unit 212 may determine whether or not at least a part of the eye of the target person is enclosed by the aperture AP, using the arithmetic model learned by machine learning based on at least one of supervised learning and unsupervised learning.

As a result of the determination in the step S12, when it is determined that at least a part of the eye of the target person is enclosed by the aperture AP (the step S12: Yes), there is a high possibility that the target person shown in the person image IMG is wearing the mask M having the aperture AP. Therefore, in this case, the impersonation determination unit 212 determines that the target person impersonates another person (a step S13).

On the other hand, as a result of the determination in the step S12, when it is determined that at least a part of the eye of the target person is enclosed by the aperture AP (the step S12: No), there is a low possibility that the target person shown in the person image IMG is wearing the mask M having the aperture AP. Therefore, in this case, the impersonation determination unit 212 determines that the target person does not impersonate another person (the step S14).

When the impersonation determination unit 212 has determined that the target person does not impersonate another person, the information processing apparatus 2 may authenticate the target person using the person image IMG. For example, in a case where the face of the target person is shown in the person image IMG, the information processing apparatus 2 may authenticate the target person by performing a face authentication using the face of the target person shown in the person image IMG. Moreover, since the eye area EA of the target person is included in the person image IMG, the information processing apparatus 2 may authenticate the target person by performing an iris authentication using the iris of the target person shown in the person image IMG. Furthermore, the information processing apparatus 2 may authenticate the target person by performing arbitrary authentication different from the face authentication and the iris authentication. Furthermore, the information processing apparatus 2 may authenticate the target person by performing arbitrary authentication different from authentication using the person image IMG.

(3) Technical Effects of Information Processing Apparatus 2

As described above, when at least a part of the eye of the target person is enclosed by the aperture AP (i.e., when the aperture AP enclosing at least a part of the eye of the target person is present) in the person image IMG, the information processing apparatus 2 determines that the target person impersonates another person. Therefore, under a situation in which the target person impersonates another person by wearing the mask M having the aperture AP at a part corresponding to the eye of another person, the information processing apparatus 2 can appropriately determine that the target person impersonates another person.

As described above, in order to determine whether or not at least a part of the eye of the target person is enclosed by the aperture AP in the person image IMG, the information processing apparatus 2 may use the edge image generated by performing edge extraction processing on at least a part of the person image IMG. That is to say, the information processing apparatus 2 may determine whether or not at least a part of the eye of the target person is enclosed by the aperture AP, using the edge image that emphasizes the outline of an object which is present in the person image IMG (for example, the eyes of the target person and the mask M having the apertures AP). In this case, in comparison with a case where the edge image is not used, the information processing apparatus 2 can more accurately determine whether or not at least a part of the eye of the target person is enclosed by the aperture AP. As a result, the information processing apparatus 2 can more accurately determine whether or not the target person impersonates another person.

(4) Modified Examples (4-1) First Modified Example

In the case where the target person is wearing the mask M, as shown in FIG. 5, in the person image IMG, at least a part of the lower edge ul_edge of the upper eyelid and the upper edge ul_edge of the lower eyelid of the target person is located at a position spaced apart from the outer edge AP_edge of the aperture AP. This is because, in general, the possibility that the size of the aperture AP formed in the mask M matches the size of the eye of the target person wearing the mask M is low. Thus, in the person image IMG, when at least a part of the lower edge ul_edge of the upper eyelid and the upper edge ul_edge of the lower eyelid of the target person is located at a position spaced apart from the outer edge AP_edge of the aperture AP, the impersonation determination unit 212 is likely to determine that at least a part of the eye of the target person in the person image IMG is enclosed by the aperture AP.

On the other hand, it cannot be said for certain that there is zero possibility that the size of the aperture AP formed in the mask M matches the size of the eye of the target person wearing the mask M. In a case where the size of the aperture AP formed in the mask M matches the size of the eye of the target person wearing the mask M, in the person image IMG, there is a possibility that each of the lower edge ul_edge of the upper eyelid and the upper edge ul_edge of the lower eyelid of the target person will overlap with the outer edge AP_edge of the aperture AP. In this case, there is a possibility that the impersonation determination unit 212 determines that at least a part of the eye of the target person is not enclosed by the aperture AP in the person image IMG. This is because there is a possibility that the outer edge AP_edge of the aperture AP which overlaps with each of the lower edge ul_edge of the upper eyelid and the upper edge ul_edge of the lower eyelid will be erroneously recognized as the outline of the eye (i.e., the lower edge ul_edge of the upper eyelid and the upper edge ul_edge of the lower eyelid). As a result, there is a possibility that the accuracy of determining whether or not the target person impersonates another person decreases.

Figure 7:
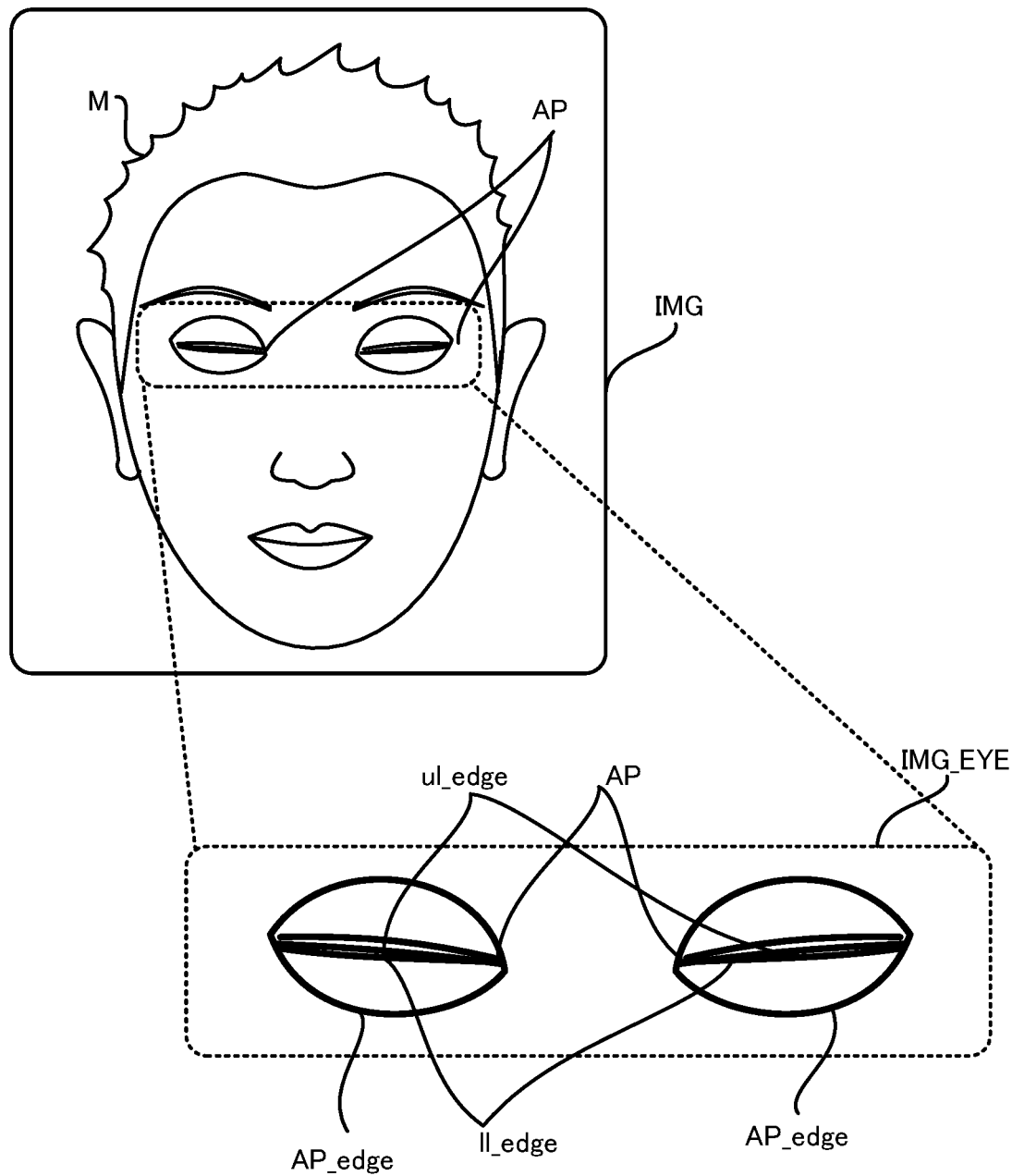
FIG. 7 is a plan view showing one example of a person image showing a target person wearing a mask having apertures and closing his eyes, together with an enlarged view of a partial image portion including the eyes of the target person in the person image.

Then, in order to accurately determine whether or not the target person impersonates another person under a situation in which the target person is wearing the mask M having the apertures AP the size of which matches the size of the eyes of the target person, the image acquisition unit 211 may acquire the person image IMG showing the target person with closed eyes in the step S11 of FIG. 4. FIG. 7 shows one example of the person image IMG showing the target person wearing the mask M with the apertures AP and closing his eyes. In the case where the target person is closing his eyes as shown in FIG. 7, even when the size of the apertures AP formed in the mask M matches the size of the eyes of the target person wearing the mask M, in the person image IMG, there is a low possibility that each of the lower edge ul_edge of the upper eyelid and the upper edge ul_edge of the lower eyelid of the target person overlaps with the outer edge AP_edge of the aperture AP. Therefore, under a situation in which the target person is wearing the mask M having the apertures AP the size of which matches the size of the eyes of the target person, the impersonation determination unit 212 can determine that at least a part of the eye of the target person is enclosed by the aperture AP in the person image IMG. As a result, even under the situation in which the target person is wearing the mask M having the apertures AP the size of which matches the size of the eyes of the target person, the impersonation determination unit 212 can accurately determine whether or not the target person impersonates another person.

Note that the image acquisition unit 211 may acquire the person image IMG showing the target person with closed eyes not only in the case where the situation in which the target person is wearing the mask M having the apertures AP the size of which matches the size of the eyes of the target person but also in the step S11 of FIG. 4.

In order to acquire the person image IMG showing the target person with closed eyes, the information processing apparatus 2 may instruct the target person to close his eyes. For example, when the information processing apparatus 2 has a display in the vicinity of the camera 1, the information processing apparatus 2 may display a graphical user interface (GUI) for instructing the target person to close his eyes.

Alternatively, the camera 1 may capture the image of the target person continuously in time. That is to say, the camera 1 may generate a plurality of person images IMG as time series data. In this case, the impersonation determination unit 212 may extract at least one person image IMG showing the target person with closed eyes from the plurality of person images IMG, and determine whether or not at least a part of the eye of the target person is enclosed by the aperture AP in the at least one extracted person image IMG.

Note that, similarly to the information processing apparatus of the comparative example described above, the information processing apparatus 2 may perform, along with the impersonation determination operation shown in FIG. 4, an impersonation determination operation for determining whether or not the target person impersonates another person by determining whether or not the target person shown in the person image IMG is blinking. In this case, in order to determine whether or not the target person is blinking, in general, the camera 1 captures the image of the target person continuously in time. That is to say, the camera 1 generates a plurality of person images IMG as time series data. In this case, the impersonation determination unit 212 may also extract at least one person image IMG showing the target person with closed eyes from the plurality of person images IMG, and determine whether or not at least a part of the eye of the target person is enclosed by the aperture AP in the at least one extracted person image IMG. As a result, the information processing apparatus 2 can perform the impersonation determination operation shown in FIG. 4 and the impersonation determination operation using blinking in parallel.

(4-2) Second Modified Example

The image acquisition unit 211 may acquire, in the step S11 shown in FIG. 4, both the person image IMG showing the target person with closed eyes, and the person image IMG showing the target person with open eyes. In this case, the impersonation determination unit 212 may determine, using the person image IMG showing the target person with closed eyes and the person image IMG showing the target person with open eyes, whether or not the target person impersonates another person.

As one example, the impersonation determination unit 212 may determine, based on the difference between the person image IMG showing the target person with closed eyes and the person image IMG showing the target person with open eyes, whether or not the target person impersonates another person. Specifically, in the case where the target person is wearing the mask M, there is a possibility that a part of the target person which is shown in the person image IMG under a situation in which the target person is closing his eyes will not be shown in the person image IMG under a situation in which the target person is opening his eyes. For example, under a situation in which the target person is closing his eyes, there is a possibility that the upper eyelid of the target person is shown in the person image IMG, but the upper eyelid of the target person is hidden with the mask M under a situation in which the target person is opening his eyes. As a result, there is a possibility that, under the situation in which the target person is opening his eyes, the upper eyelid of the target person is not shown in the person image IMG. In this case, regarding whether or not the upper eyelid is shown, there is a difference between the person image IMG showing the target person with closed eyes and the person image IMG showing the target person with open eyes. Therefore, the impersonation determination unit 212 can determine, based on the difference between the person image IMG showing the target person with closed eyes and the person image IMG showing the target person with open eyes, whether or not the target person impersonates another person. Specifically, for example, the impersonation determination unit 212 may determine whether a part of the target person which is shown in the person image IMG under a situation in which the target person is closing his eyes is not shown in the person image IMG under a situation in which the target person is opening his eyes. In the case where a part of the target person which is shown in the person image IMG under a situation in which the target person is closing his eyes is not shown in the person image IMG under a situation in which the target person is opening his eyes, the impersonation determination unit 212 may determine that the target person impersonates another person.

Even in this case, the apertures AP enclosing the eyes of the target person (specifically, the mask M having the apertures AP) are still the cause of the difference between the person image IMG showing the target person with closed eyes and the person image IMG showing the target person with open eyes. That is to say, the reason why a part of the target person which is shown in the person image IMG under a situation in which the target person is closing his eyes is not shown in the person image IMG under a situation in which the target person is opening his eyes is still the apertures AP enclosing the eyes of the target person (specifically, the mask M having the apertures AP). Therefore, the operation for determining whether or not a part of the target person which is shown in the person image IMG under a situation in which the target person is closing his eyes is not shown in the person image IMG under a situation in which the target person is opening his eyes may be practically regarded as equivalent to the operation for determining whether or not at least a part of the eye of the target person is enclosed by the aperture AP in the person image IMG.

(5) Supplementary Note

With respect to the example embodiments described above, the following Supplementary Notes will be further disclosed.

[Supplementary Note 1]
An information processing apparatus including:
an acquisition unit configured to acquire a person image including an eye area of a target person; and
a determination unit configured to determine that the target person impersonates another person in the case where an aperture enclosing at least a part of an eye of the target person included in the eye area is present in the person image.

[Supplementary Note 2]
The information processing apparatus according to the Supplementary Note 1, wherein
the acquisition unit acquires the person image including the eye area of the target person with closed eyes.

[Supplementary Note 3]
The information processing apparatus according to the Supplementary Note 1 or 2, wherein
the determination unit performs (i) edge extraction processing on at least a part of the person image, and, (ii) in the case where an edge enclosing at least a part of an eye of the target person included in the eye area is extracted, determines that the aperture enclosing at least a part of the eye of the target person included in the eye area is present.

[Supplementary Note 4]
The information processing apparatus according to any one of Supplementary Notes 1 to 3, wherein
the acquisition unit acquires a first image as the person image including the eye area of the target person with closed eyes, and a second image as the person image including the eye area of the target person with open eyes, and
the determination unit determines, based on a difference between the first image and the second image, whether or not the target person impersonates another person.

[Supplementary Note 5]
An information processing method including:
acquiring a person image including an eye area of a target person; and,
determining that the target person impersonates another person in the case where an aperture enclosing at least a part of an eye of the target person included in the eye area is present in the person image.

[Supplementary Note 6]
A recording medium storing a computer program for causing a computer to execute an information processing method including:
acquiring a person image showing a target person, and,
determining that the target person impersonates another person in the case where an aperture enclosing at least a part of an eye of the target person included in the eye area is present in the person image.

At least a part of the components of each of the example embodiments described above may be appropriately combined with at least another part of the components of each of the example embodiments described above. At least a part of the components of each of the example embodiments described above may not be used. In addition, to the extent permitted by law, the disclosure of all references (for example, published gazettes) cited in this disclosure will be incorporated as part of the description of this disclosure.

This disclosure may be modified as appropriate within the scope not departing from the technical idea which can be read from the claims and the entire specification. An information processing apparatus, an information processing method, a computer program, and a recording medium which involve such modifications are also intended to be included in the technical idea of this disclosure.

BRIEF DESCRIPTION OF REFERENCE NUMBERS

1 Camera
2 Information processing apparatus
21 Arithmetic apparatus
211 Image acquisition unit
212 Impersonation determination unit
3 Communication network
SYS Impersonation determination system
M Mask
AP Aperture
IMG Person image

The invention claimed is:

1. An information processing apparatus comprising:
at least one memory configured to store instructions; and
at least one processor configured to execute the instructions to:
acquire a person image including an eye area of a target person with eyes closed;
perform, by the at least one processor, edge extraction processing on the person image to generate an edge image;
extract, from the edge image, an edge enclosing at least a part of an eye of the target person included in the eye area, an edge of an upper eyelid of the target person and an edge of a lower eyelid of the target person, while the eye of the target person is closed;
determine, in response to simultaneously detecting the edge enclosing the at least the part of the eye of the target person and both the edge of upper eyelid and the edge of lower eyelid while the eye of the target person is closed, a determination of whether the target person impersonates another person; and
output the result indicating that the target person impersonates another person,
wherein the at least one processor is further configured to determine whether or not an accessory having an aperture enclosing the at least the part of the eye of the target person is in the person image, and if it is determined the person is wearing an accessory having an aperture enclosing the at least the part of the eye, the target person impersonates another person.

2. The information processing apparatus according to claim 1, wherein the at least one processor is further configured to execute the instructions to acquire the person image from a plurality of person images that are captured continuously in time, and
wherein the plurality of person images includes the eye area of the target person.

3. The information processing apparatus according to claim 1, wherein the edge enclosing at least the part of the eye of the target person is the edge of an aperture formed in the accessory worn by the target person.

4. An information processing method comprising:
acquiring, by at least one processor, a person image including an eye area of a target person with eyes closed;
performing, by the at least one processor, edge extraction processing on the person image to generate an edge image;
extract, from the edge image, an edge enclosing at least a part of an eye of the target person included in the eye area, an edge of an upper eyelid of the target person and an edge of a lower eyelid of the target person, while the eye of the target person is closed;
determining, by the at least one processor, in response to simultaneously detecting the edge enclosing the at least the part of the eye of the target person and both the edge of upper eyelid and the edge of lower eyelid while the eye of the target person is closed, a determination of whether the target person impersonates another person; and
output the result indicating that the target person impersonates another person,
wherein information processing method further comprises determining, by the at least one processor, whether or not an accessory having an aperture enclosing the at least the part of the eye of the target person is in the person image, and if it is determined the person is wearing an accessory having an aperture enclosing the at least the part of the eye, the target person impersonates another person.

5. The information processing method according to claim 4, the information processing method further comprising:
acquiring the person image from a plurality of person images that are captured continuously in time,
wherein the plurality of person images includes the eye area of the target person.

6. A non-transitory recording medium storing a computer program, which when executed, causes a computer to execute an information processing method comprising:
acquiring, by at least one processor, a person image including an eye area of a target person with eyes closed;
performing, by the at least one processor, edge extraction processing on the person image to generate an edge image;
extract, from the edge image, an edge enclosing at least a part of an eye of the target person included in the eye area, an edge of an upper eyelid of the target person and an edge of a lower eyelid of the target person, while the eye of the target person is closed;
determining, by the at least one processor, in response to simultaneously detecting the edge enclosing the at least the part of the eye of the target person and both the edge of upper eyelid and the edge of lower eyelid while the eye of the target person is closed, a determination of whether the target person impersonates another person; and
output the result indicating that the target person impersonates another person,
wherein information processing method further comprises determining, by the at least one processor, whether or not an accessory having an aperture enclosing the at least the part of the eye of the target person is in the person image, and if it is determined the person is wearing an accessory having an aperture enclosing the at least the part of the eye, the target person impersonates another person.

7. The non-transitory recording medium according to claim 6, the information processing method further comprising:
    acquiring the person image from a plurality of person images that are captured continuously in time,
    wherein the plurality of person images includes the eye area of the target person.

* * * * *